United States Patent
Ganz et al.

(10) Patent No.: US 9,520,625 B2
(45) Date of Patent: Dec. 13, 2016

(54) COOLING DEVICE FOR A BATTERY SYSTEM, IN PARTICULAR OF A MOTOR VEHICLE

(71) Applicants: Matthias Ganz, Stuttgart (DE); Oleksandr Pavlov, Herrenberg (DE); Bernd Schaefer, Stuttgart (DE)

(72) Inventors: Matthias Ganz, Stuttgart (DE); Oleksandr Pavlov, Herrenberg (DE); Bernd Schaefer, Stuttgart (DE)

(73) Assignee: Mahle Behr GmbH & Co. KG (DE)

( * ) Notice: Subject to any disclaimer, the term of this patent is extended or adjusted under 35 U.S.C. 154(b) by 256 days.

(21) Appl. No.: 14/494,574

(22) Filed: Sep. 23, 2014

(65) Prior Publication Data

US 2015/0082821 A1    Mar. 26, 2015

(30) Foreign Application Priority Data

Sep. 24, 2013  (DE) .................. 10 2013 219 200

(51) Int. Cl.
  *H01M 10/625*    (2014.01)
  *F25B 1/00*    (2006.01)
  (Continued)

(52) U.S. Cl.
  CPC .......... *H01M 10/5016* (2013.01); *B60H 1/00* (2013.01); *F25B 1/005* (2013.01); *F25B 5/00* (2013.01);
  (Continued)

(58) Field of Classification Search
  CPC ............... H01M 10/5016; H01M 10/6556; H01M 10/663; H01M 10/613; H01M 10/625; B60H 1/00; F25B 5/00; F25B 1/005
  See application file for complete search history.

(56) References Cited

U.S. PATENT DOCUMENTS 5,678,760 A * 10/1997 Muso .................. B60K 11/02
                                                    165/41
2009/0142653 A1 * 6/2009 Okada ................. H01M 2/1077
                                                    429/120

(Continued)

FOREIGN PATENT DOCUMENTS

DE    102007021293 A1    11/2008
DE    102009058808 A1    6/2011
(Continued)

OTHER PUBLICATIONS

English abstract for DE-102010056204.
(Continued)

*Primary Examiner* — Emmanuel Duke
(74) *Attorney, Agent, or Firm* — Fishman Stewart PLLC (57) ABSTRACT

A cooling device for a battery system may include at least two battery units. The cooling device may include at least a first and a second cooling plate able to be flowed through respectively by a coolant. The first and second cooling plate may be arranged respectively for thermal coupling with a respective battery unit. The first and second cooling plate each may include a first fluid inlet, which is connected fluidically with a first fluid outlet via a first fluid duct extending along an extent direction, and a second fluid inlet, which is connected fluidically with a second fluid outlet via a second fluid duct extending along the extent direction.

20 Claims, 4 Drawing Sheets

(51) Int. Cl.
*H01M 10/613* (2014.01)
*F25B 5/00* (2006.01)
*B60H 1/00* (2006.01)
*H01M 10/663* (2014.01)
*H01M 10/6556* (2014.01)

(52) U.S. Cl.
CPC ......... *H01M 10/613* (2015.04); *H01M 10/625* (2015.04); *H01M 10/6556* (2015.04); *H01M 10/663* (2015.04)

(56) References Cited

U.S. PATENT DOCUMENTS

| | | | |
|---|---|---|---|
| 2013/0189558 A1 | 7/2013 | Haussmann | |
| 2014/0011059 A1* | 1/2014 | Hashimoto | H01M 2/1077 429/72 |

FOREIGN PATENT DOCUMENTS

| | | |
|---|---|---|
| DE | 102009058809 A1 | 6/2011 |
| DE | 102010056204 A1 | 9/2011 |
| DE | 102010032898 A1 | 2/2012 |

OTHER PUBLICATIONS

English abstract for DE-102009058809.
English abstract for DE-102009058808.
English abstract for DE-102007021293.

* cited by examiner

COOLING DEVICE FOR A BATTERY SYSTEM, IN PARTICULAR OF A MOTOR VEHICLE

CROSS-REFERENCE TO RELATED APPLICATIONS

This application claims priority to German Patent Application No. 10 2013 219 200.2, filed Sep. 24, 2013, the contents of which are hereby incorporated by reference in their entirety.

TECHNICAL FIELD

The present invention relates to a cooling device for a battery system, in particular of a motor vehicle, and a battery system with such a cooling device. The invention further relates to an air conditioning circuit with such a battery system. The invention finally relates to a motor vehicle with at least one such battery system or with one such air conditioning circuit.

BACKGROUND

In modern hybrid and electric motor vehicles, lithium-ion batteries are often used as rechargeable energy stores. A battery system which is optimized with regard to lifespan and maximum energy storage amount requires for the individual cells of a complete battery system—which are to be designated below as "battery units"—a correspondingly efficiently dimensioned cooling system, which is able to prevent an overheating of the battery units beyond a maximum permissible operating temperature. From the prior art, in this connection, is the integration of such a cooling system, which—based on the vaporizer principle known to the specialist in the art—permits a heat exchange via structurally suitably constructed cooling plates between the battery units and a liquid coolant flowing through the cooling ducts, wherein the enthalpy of vaporization necessary for the vaporizing of the liquid coolant is taken from the battery units in the form of heat. In order to now keep the manufacturing costs as low as possible for such a cooling device, it is usual to construct this with several individual cooling plates, wherein a particular battery unit of the entire battery system is associated with each cooling plate. Such a modular approach allows the size and therefore the efficiency both of the battery system and also of the cooling device necessary for the cooling of the battery system to be adapted to the most varied of requirements. Thus, a battery system of modular construction with two battery units and consequently cooling plates necessary for the cooling thereof may be sufficient for installation in a small car, whereas a battery system of such dimensions must be supplemented by two further battery units including two additional cooling plates for use in a limousine.

However, it proves to be problematic in such cooling devices of modular construction to achieve a uniform, i.e. homogeneous cooling efficiency in the individual cooling plates both relative to one another and also within a single cooling plate. As the vaporization temperature of the coolant is dependent on the fluid pressure in the fluid ducts and this decreases as a consequence of the drop in pressure occurring continuously during the flowing through of the individual cooling plates, the temperature also changes at which the initially liquid coolant vaporizes. This leads, in turn, to undesired inhomogeneities in the temperature distribution of the coolant within the cooling plate. This effect proves to be problematic to a particular extent when the entire cooling device is operated as part of a regulating circuit which adjusts the actual temperature actually measured in the battery units to a predetermined desired value.

SUMMARY

The present invention therefore sets itself the problem of creating a cooling device of modular construction, which is distinguished by a homogeneous temperature distribution of the coolant flowing through it in all its cooling plates.

This problem is solved by the subject matter of the independent claims. Preferred embodiments are the subject matter of the dependent claims.

The basic idea of the invention, accordingly, is to provide the cooling device with at least two cooling plates which are individual, but connected fluidically with one another, wherein in the first and second cooling plate respectively a first fluid inlet is provided, which is connected fluidically by means of a first fluid duct with a first fluid outlet, and a second fluid inlet is provided, which is connected fluidically by means of a second fluid duct with a first fluid outlet. In other words, in each cooling plate two fluid ducts are present, separated from one another, with respectively individual inlets and outlets. Both fluid ducts extend here along a shared extent direction. In order to achieve as uniform a temperature distribution as possible in the different cooling plates, it is proposed according to the invention to connect the fluid inlets and fluid outlets of the cooling plates of the cooling device with one another such that in at least one cooling plate a coolant flowing in the extent direction through the first fluid duct thereof flows contrary to the extent direction through the second fluid duct of the same cooling plate or vice versa.

In this way, it is largely or even entirely prevented that during the flowing through of the two fluid ducts in the same cooling plate the fluid pressure of the coolant within a cooling plate decreases or increases along the extent direction of the fluid duct, as would be the case if the coolant were to flow in the two fluid ducts in the same direction—i.e. either in both fluid ducts in the extent direction or in both fluid ducts contrary to the extent direction—, because then the boiling temperature, at which the liquid coolant boils, would likewise decrease along the longitudinal direction. This would lead to an undesired reduction of the cooling efficiency provided by the coolant within a cooling plate along the extent direction. Particularly preferably, therefore, the counter-current principle explained above is applied in all cooling plates of the cooling device.

In contrast, the fluid connections of the cooling plates according to the invention, which are explained here, permit a bidirectional through-flow of each cooling plate, i.e. a pressure drop possibly developing in the first or second fluid duct along the longitudinal direction is balanced out again by the second or respectively first fluid duct of the same cooling plate. This results in a uniform provision of cooling efficiency by the coolant and therefore ultimately in a temperature distribution generated by the coolant, which proves to be distinctly more homogeneous than that in cooling plates in which the coolant does not flow in a bidirectional manner through the two fluid ducts.

According to a preferred variant embodiment, it is proposed to arrange the two cooling plates substantially parallel to one another, for instance along a longitudinal direction of the cooling plate, when the latter is provided for instance with respect to a top view with a substantially rectangular geometric shape. In this case, the two fluid ducts may extend respectively substantially along the longitudinal direction adjacent to one another from a first longitudinal direction end section to a second longitudinal direction end section of the cooling plate, and namely either directly adjacent to one another or at a distance from one another. The bidirectional arrangement described above can be achieved here through for instance the following two structural measures:

a) the first fluid inlet and second fluid outlet are to be arranged with respect to the transverse direction of the cooling plate adjacent to one another in the region of the first end section, b) the first fluid outlet and second fluid inlet are to be arranged with respect to the transverse direction of the cooling plate adjacent to one another in the region of the second end section.

Battery systems with three battery units have proved to be particularly popular in the development of modern motor vehicles. In a preferred embodiment of the cooling device which is presented here, therefore, in addition to the first and second cooling plate described above, in addition a third cooling plate is provided, which has the same characteristics as the first and second cooling plate and which is consequently to be connected fluidically with the two remaining cooling plates in a manner according to the invention. It is clear that in advantageous further developments, further additionally cooling plates can be provided, in order to cool further battery units which are present, if applicable.

In a preferred embodiment, the two fluid ducts of the at least two cooling plates can be connected with one another fluidically such that the coolant flows in succession through the fluid ducts of at least two different cooling plates, preferably of three different cooling plates. In other words, the coolant flows through in the respective cooling plates, not directly in succession the first and second fluid duct of the same cooling plate. In this way, the cooling efficiency provided by the coolant in the cooling device can be homogenized.

In another preferred embodiment, the fluid ducts of the at least two cooling plates can be connected with one another fluidically such that the coolant in at most one, preferably in at most two, particular cooling plate(s) flows through the first fluid duct and subsequently through the second fluid duct of the same cooling plate. This measure also leads to an advantageous homogenization of the cooling efficiency provided by the cooling plates of the cooling device.

Particularly expediently, the fluid ducts of the cooling plates can be connected fluidically in series to one another such that no fluid branch is provided between two fluidically adjacent cooling plates. This permits a structurally particular composition of the cooling device.

Alternatively thereto, however, to shorten the directing path for the coolant, at least two fluid plates can also be connected fluidically parallel to one another, so that fluid branches for dividing or bringing together the coolant flow can be constructed between two fluidically adjacent cooling plates.

The cooling of the battery units, coupled thermally to the individual cooling plates and functioning as heat sources, takes place in a known manner by a suitable liquid coolant, which is able to flow through the individual cooling plates cyclically, typically as part of a cooling circuit. As the initially liquid coolant receives heat in the course of the cooling of the various battery units and, in so doing, is at least partially vaporized, it is necessary to also provide a heat sink in the coolant circuit, to which the coolant can deliver again the heat received from the battery units, so that it is able to receive heat again in further through-flow cycles.

Such a heat sink can be realized by fluidic coupling of the cooling plate of the cooling device according to the invention to an air conditioning circuit, such as is installed as standard in modern motor vehicles, in order to control the temperature of the vehicle interior thereof.

However, an embodiment is able to be realized technically in a particularly simple manner, in which the first and the second fluid duct are respectively constructed as flat tubes mounted on the cooling plate. Such flat tubes typically have a large contact area—in particular with respect to their tube cross-section—, for example in the shape of their upper sides facing away from the actual cooling plate, on which the battery units which are to be cooled can be brought to abut for thermal coupling.

In order to further increase the size of the coupling area between cooling plate and battery unit it is recommended, for the first and/or second fluid duct, to provide not only a single flat tube, but respectively at least two, preferably even three flat tubes, extending substantially along the longitudinal direction of the cooling plate and arranged at a distance from one another or directly adjoining one another. In this way, on the one hand the flow cross-section of the entire fluid duct, composed of at least two flat tubes, and therefore the coolant throughput through the respective cooling plate, can be increased, but on the other hand also the contact area between the fluid duct and the battery unit which is to be cooled can be improved. The fluidic separation between the individual flat tubes, which can be realized for instance in the manner of several cross-pieces, leads furthermore to an improvement of the mechanical rigidity of the fluid ducts, so that the battery cells of the battery units which are to be cooled, which cells typically have a relatively high own weight, can rest on the upper side of the flat tubes, without this leading to an undesired deformation of the flat tubes.

An embodiment is able to be produced particularly simply in terms of manufacturing technique, in which the respective flat tube is formed integrally on the cooling plate, i.e. the cooling plate and the flat tube are produced as one unit.

As already mentioned, it is advantageous for as high a cooling efficiency as possible, achievable by the cooling device, to bring the respective battery unit into abutment in a flat manner against the flat tubes. This may be successful in a particularly effective manner when the battery units are brought respectively into abutment with their base side in a flat manner against the upper side of the flat tubes.

A particularly compact structural form can be achieved for the individual cooling plates of the cooling device, by the two fluid inlets and/or the two fluid outlets being constructed as pipe connections, which project substantially perpendicularly from the respective cooling plate. The battery unit which is to be cooled by the cooling plate can then be arranged centred to the said inlets and outlets with respect to a top view onto the cooling plate, whereby installation space can be saved to a not insignificant extent compared with conventional arrangements. In other words, the battery unit, which is typically constructed with the geometric shape of a cuboid, is placed in a space-saving manner on the cooling plate such that—with respect to the top view onto the cooling plate—a fluid inlet or fluid outlet of the cooling plate is arranged respectively in the region of a corner of the battery unit.

The cooling device presented above is suitable to a particular extent for the cooling of modular battery systems of motor vehicles. The present invention therefore also relates to a battery system with integrated cooling function, which comprises at least a first and a second battery unit, in which separate components are concerned. According to the energy requirement of the motor vehicle, in which the battery system is to be installed, this can be supplemented by further battery units, in order to adapt the maximum energy storage amount of the entire battery system to the number and performance requirement of the electric consumers which are installed in the respective vehicle type. The integrated cooling function is realized in the battery system by a cooling device according to the invention, with one or more of the features discussed above. For this, each battery unit is coupled thermally with a cooling plate which is associated with it.

An embodiment proves to be particularly compact structurally here, in which a cover plate is associated with each cooling plate of the cooling device such that the battery unit is arranged in the manner of a sandwich between the cooling plate and the cover plate. This allows, for instance, several structural units of cover plate, battery unit and cooling plate to be arranged in the manner of a stack over one another along a stacking direction and in this way allows them to be installed in the engine compartment of a motor vehicle in a particularly space-saving manner.

In an embodiment which is to be preferred from the point of view of manufacturing technique, it is recommended to produce the cover plate with a plate material of aluminium or plastic. Both materials are commercially available in large quantities and are also able to be processed in a favourably priced manner, so that a multiplicity of forms of realization emerge for the relevant specialist in the art in the manufacture of the cover plate.

The invention further relates to an air conditioning circuit for a motor vehicle, as is installed as standard in modern motor vehicles to control the temperature of the vehicle interior. Such an air conditioning circuit has a compressor for compressing the coolant and a condenser, arranged downstream of the compressor, for cooling the compressed coolant. Upstream of the compressor, in turn, a vaporizer is arranged, which is provided with a vaporizer inlet and with a vaporizer outlet. The previously presented battery system is provided as part of the air conditioning system, wherein the cooling device of the battery system communicates fluidically with the vaporizer inlet and with the vaporizer outlet of the air conditioning circuit.

Finally, the invention relates to a motor vehicle with at least one battery system with one or more of the above-mentioned features or with a previously presented air conditioning system.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

Figure 1:
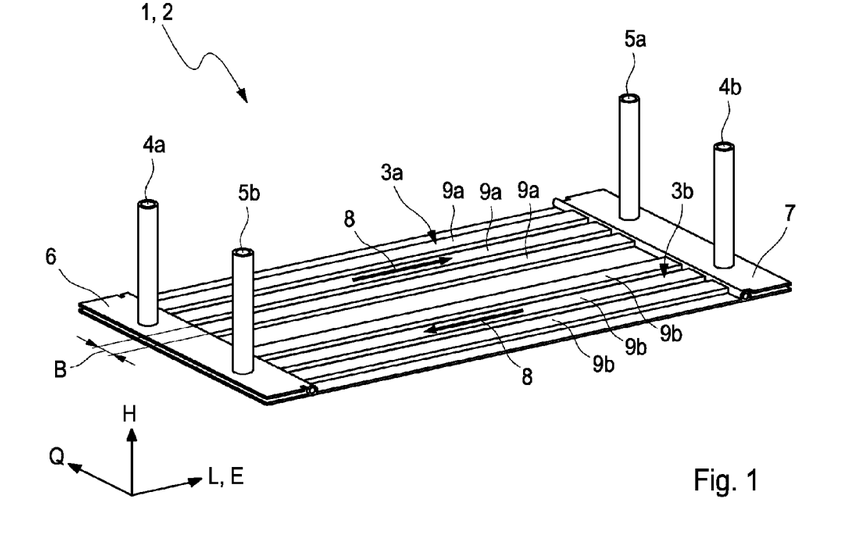
FIG. 1 a cooling plate of the cooling device according to the invention in a perspective illustration, FIGS. 2a-2e illustrations, in the manner of a connection diagram, of various cooling devices according to the invention, with respectively three cooling plates, which are connected fluidically with one another in different ways, FIG. 3 an illustration, in the manner of a connection diagram, of an air conditioning circuit with a cooling device comprising three cooling plates.

FIG. 1 illustrates an example of a cooling plate 2 of a cooling device 1 according to the invention, which is equipped with at least two such cooling plates 2. The cooling plate 2 is arranged for the cooling of a battery unit, not shown in FIG. 1, by thermal coupling thereto. For this, the cooling plate 2 has a first and a second fluid duct 3a, 3b, which can be flowed through by a suitable coolant.

A first fluid inlet 4a, which is connected fluidically with a first fluid outlet 5a by means of the first fluid duct 3a, is now provided in the cooling plate 2. Likewise, in the cooling plate 2, a second fluid inlet 4b is provided, which is connected fluidically with a second fluid outlet 5b by means of the second fluid duct 3b. The two fluid ducts 3a, 3b extend respectively substantially along a longitudinal direction L of the cooling plate 2, and namely adjacent to one another from a first longitudinal direction end section 6 to a second longitudinal direction end section 7 of the cooling plate 2.

It can be seen in addition from the illustration of FIG. 1 that the first fluid inlet 4a and the second fluid outlet 5b are arranged adjacent to one another, with respect to a transverse direction Q of the cooling plate 2, in the region of the first end section 6. The same applies for the first fluid outlet 5a and the second fluid inlet 4b, which are arranged adjacent to one another, with respect to the said transverse direction Q, in the region of the second end section 7. The two fluid inlets 4a, 4b and the two fluid outlets 5a, 5b are connected fluidically with one another such that a coolant flowing in the longitudinal direction L of the cooling plate 2 through the first fluid duct 3a flows contrary to the longitudinal direction L through the second fluid duct 3b or vice versa. The former case is illustrated in FIG. 1 diagrammatically by the two arrows 8, designated by 8 and indicating the flow direction of the coolant. The two fluid inlets 4a, 4b and the two fluid outlets 5a, 5b are constructed here in the manner of pipelines which project substantially perpendicularly from the cooling plate 2.

In the example scenario of FIG. 1, each of the two fluid ducts 3a, 3b comprises three flat tubes 9a, 9b, which are formed integrally on the actual cooling plate 2, i.e. cooling plate 2 and flat tubes 9a, 8b were produced in one piece. Of course, numerous variation possibilities to the example scenario shown here emerge for the technically experienced specialist in the art with regard to the number of flat tubes 9a, 9b to be provided on the cooling plate. Alternatively or additionally, it is also to be considered in the production of the cooling plate 2 not to form the said flat tubes 9a, 9b integrally thereon, but rather to firstly manufacture them separately and to fasten them thereto in a form-fitting manner, for instance with the aid of a welded connection, in an additional manufacturing step.

The flat tubes 9a, 9b have a height (not designated in FIG. 1), with respect to a vertical direction H of the cooling plate which runs orthogonally to the longitudinal and transverse direction L, Q, which height corresponds to a fraction, for instance at most $\frac{1}{5}$, preferably at most $\frac{1}{10}$, of a width B of the flat tubes 9a, 9b, extending in transverse direction Q. In this way, a large contact area can be achieved between the flat tubes 9a, 9b and the battery unit (not shown in FIG. 1, cf. FIGS. 2a-e) which is to be cooled, when the latter is brought to abutment for instance with its base side on the upper side of the flat tubes 9a, 9b.

In FIGS. 2a to 2e, various examples for cooling devices 1 with respectively three cooling plates 2a, 2b, 2c are now illustrated in the manner of a connection diagram, which have respectively a first and a second fluid duct 3a, 3b. Battery units 12a, 12b, 12c are arranged on the cooling plates 2a, 2b, 2c, which battery units couple thermally to the fluid ducts 3a, 3b of the cooling plates 2a, 2b, 2c.

Figure 2:
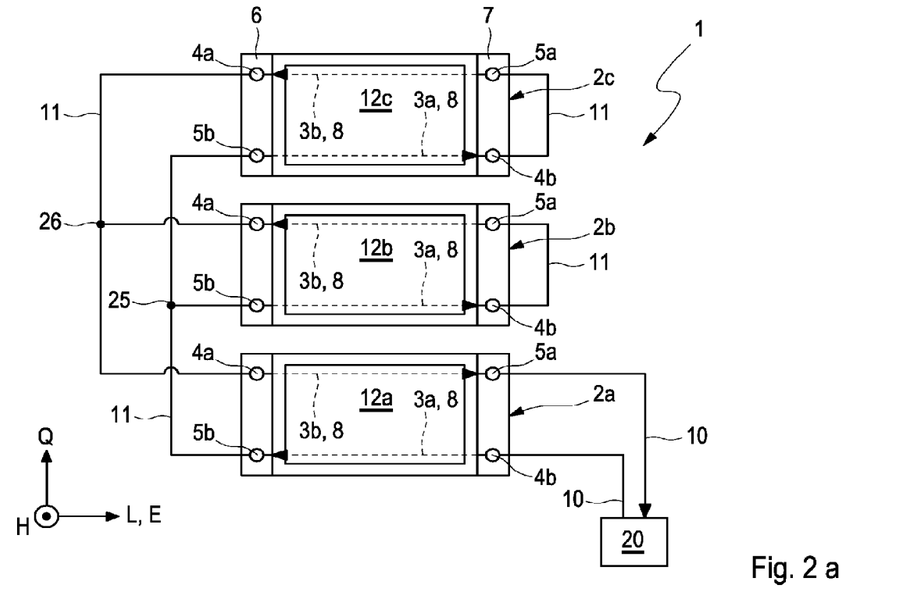

In the following, without loss of generality, the cooling plate 2a is designated as first cooling plate, which is connected fluidically directly—without further interposed cooling plates—with the air conditioning circuit 20.

Figure 2D:
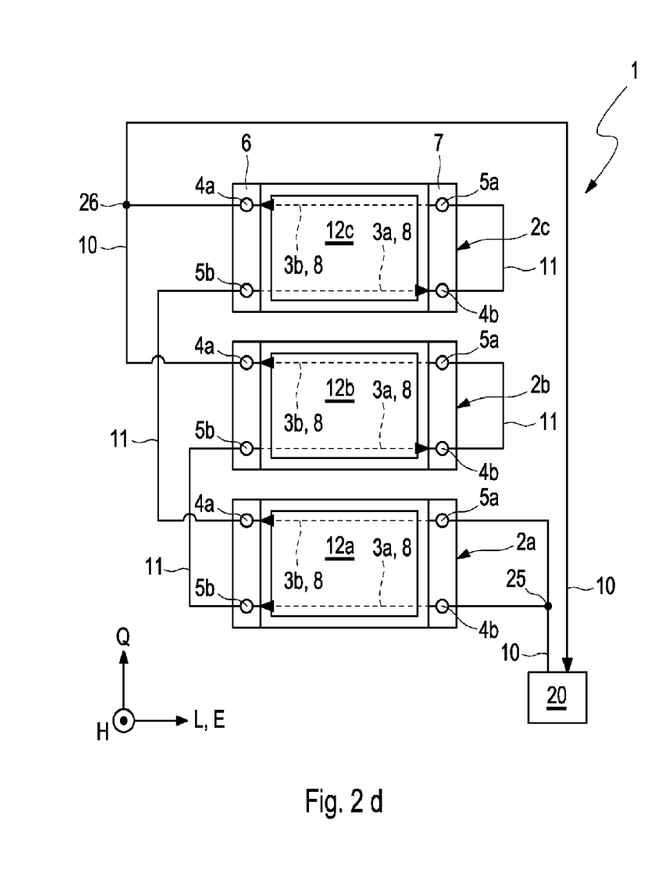

All the examples which are to be explained in further detail below have in common that the fluid inlets 4a, 4b and fluid outlets 5a, 5b of all cooling plates 2a, 2b, 2c of the cooling devices 1 are connected with one another such that in the case of at least one cooling plate 2a, 2b, 2c—with the exception of the example of FIG. 2d even in all cooling plates 2a, 2b, 2v of the respective cooling device 1—a coolant flowing in the extent direction—in the example scenario of FIGS. 2a to 2e therefore along the longitudinal direction L—of the cooling plates 2a, 2b, 2c—through the first fluid duct 3a flows contrary to the extent direction through the second fluid duct 3b of the same cooling plate 2a, 2b, 2c. This is indicated in FIGS. 2a to 2e in an analogous manner to FIG. 1 by the arrows 8. The fluidic connection of the individual cooling plates 2a, 2b, 2c with one another takes place by means of suitable connecting ducts 11, which are constructed for example in the form of connecting tubes and which connect the individual connecting ducts 3a, 3b of the different cooling plates 2a, 2b, 2c with one another in a fluid-tight manner with respect to the environment.

The cooling plates 2a, 2b, 2c are furthermore connected fluidically, by means of fluid ducts 10 which can be constructed in terms of manufacturing technique likewise in the form of connecting tubes, with an air conditioning circuit 20 of a motor vehicle, which provides the heat sink necessary for the cooling or respectively liquefaction of the coolant. The said air conditioning circuit 20 is indicated only roughly diagrammatically in FIGS. 2a to 2e, but is explained more precisely below with the aid of FIG. 3, which shows such an air conditioning circuit in the manner of a connection diagram. The cooling device 1 is suitable to a particular extent for the cooling of modular battery systems with at least two battery units 12a, 12b, 12c, in which the concern, as illustrated diagrammatically in FIGS. 2a to 2e, is with separate components. According to the energy requirement of the motor vehicle in which the battery system is to be installed, the latter can be supplemented by further battery units, in order in this way to adapt the maximum energy storage amount of the entire battery system to the number and efficiency requirement of the electric consumers installed in the respective motor vehicle type. In the battery system according to the invention, the integrated cooling function is realized by the cooling device 1. For this, each battery unit 12a, 12b, 12c is coupled thermally respectively with a cooling plate 2a, 2b, 2c of the cooling device 1 associated with it.

A cover plate—for example of aluminium or of plastic—, not shown in the diagrammatic illustration of FIGS. 2a to 2e, can be associated with each cooling plate 2a, 2b, 2c, so that the respective battery unit 12a, 12b, 12c is arranged in the manner of a sandwich between the cooling plate 2a, 2b, 2c and the cover plate.

In the example of FIG. 2a, the second and third cooling plates 2b and 2c are connected fluidically parallel to one another and these two cooling plates 2b, 2c are connected together fluidically in series to the first cooling plate 2a. The coolant flows firstly through the first fluid duct 3a of the first cooling plate 2a and is then distributed at the fluid branch 25 downstream of the first cooling plate 2a to the two first fluid ducts 3a of the second or respectively third cooling plate 2b, 2c. After the flowing through of the first fluid duct 3a of the second or respectively third cooling plate 2b, 2c, the coolant is guided directly into the second fluid duct 3b of the same cooling plate 2b or respectively 2c. After emerging from the second fluid duct 3b of the second or respectively third cooling plate 2b, 2c, the coolant is guided together again via a further fluid branch 26 downstream of these two cooling plates 2b, 2c. The coolant subsequently flows through the second fluid duct 3b of the first cooling plate 2a. By means of the fluidic connection explained above, it is ensured that the coolant flows through the first cooling plate 2a on flowing through its first fluid duct 3a at the highest pressure level, and on flowing through the second fluid duct 3b at the lowest pressure level. The pressure difference of the coolant in the two fluid ducts 3a, 3b of the first cooling plate is therefore greatest compared with the two cooling plates 2b, 2c. In contrast, the pressure difference of the coolant in the second cooling plate is identical relative to the third cooling plate 2b, 2c. As a result, together with the counter-current principle in the individual cooling plates 2a-2c this leads to a homogenized cooling efficiency of the cooling device 1.

In the example of FIG. 2b, the fluid ducts 3a, 3b of the three cooling plates 2a, 2b, 2c are connected fluidically with one another such that the coolant flows successively through the first fluid ducts 3a of the first, second and third cooling plate 2a, 2b, 2c and then successively through the second fluid ducts 3b of the third, second and first cooling plate 2c, 2b, 2a—i.e. in reverse order. By means of such a series connection without fluid branches in combination with the counter-current principle essential to the invention, it is ensured that the coolant flows through the first cooling plate 2a on flowing through the first fluid duct 3a thereof at the highest pressure level and on flowing through the second fluid duct 3b thereof at the lowest pressure level. The pressure difference of the coolant in the two fluid ducts 3q, 3b of the first cooling plate is therefore greatest compared with the two cooling plates 2b, 2c. In contrast, the pressure difference of the coolant in the third cooling plate 2c is—viewed relatively—the least compared with the pressure difference in the first and second cooling plate. This also leads to a particularly uniform cooling efficiency, which is provided by the cooling device 1. The dispensing with fluid branches 25, 26 simplifies the structure and therefore the manufacturing costs of the cooling device.

The example of FIG. 2c shows a variant of the example of FIG. 2a, in which the two first cooling plates 2a, 2b are connected fluidically parallel to one another with the aid of fluid branches 25, 26, such that the coolant either flows through the first fluid duct 3a of the first cooling plate 2a or of the second cooling plate 2b and accordingly the second fluid duct 3b of the first cooling plate 2a or of the second cooling plate 2b and compulsorily the two fluid ducts 3a, 3b of the third cooling plate. The use of a total of four fluid branches 25, 26, owing to the fluidic parallel connection connected therewith, conducts particularly short directing paths for the coolant on flowing through the cooling plates 2a-2c.

The example of FIG. 2d differs from those of FIGS. 2a to 2c in that in the first cooling plate 2a the coolant flows in the same direction through the two fluid ducts 3a, 3b, for which it is distributed in a fluid branch 25 upstream of the first cooling plate 2a to the two fluid ducts 3a, 3b. After the flowing through of the three cooling plates 2a-2c, the coolant distributed in the fluid branch 25 is directed together again by means of the fluid branch 26 downstream of the third cooling plate 2c.

Figure 2E:
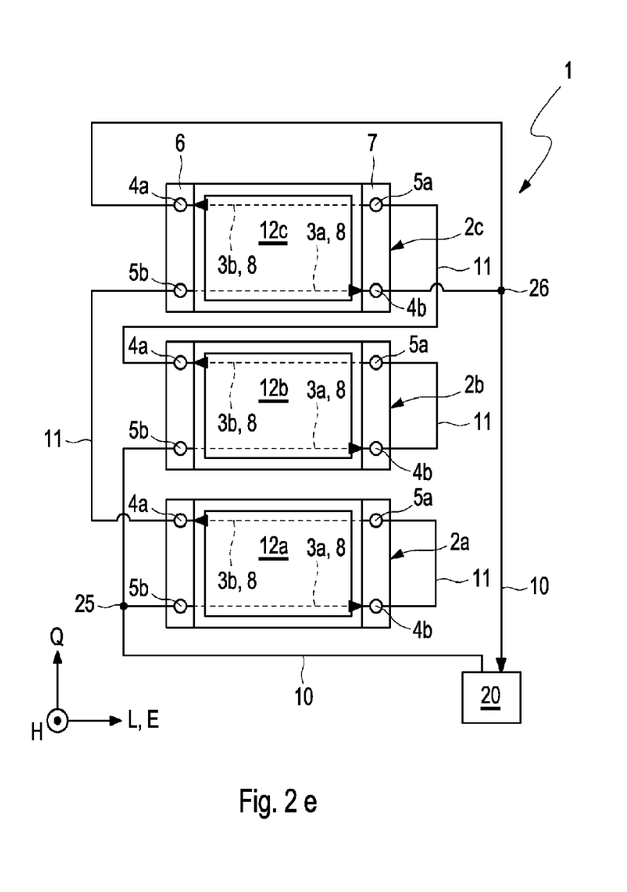

FIG. 2e shows a further advantageous fluidic connection of the three cooling plates 2a-2c with one another. A fluid branch 25 is already provided upstream of the first cooling plate 2a, which fluid branch distributes the coolant to the first or respectively second cooling plate 2a, 2b. In the first cooling plate 2a, the two fluid ducts 3a, 3b are flowed through successively in the counter-current principle. The same applies for the second cooling plate 2b. The coolant flowing through the first cooling plate 2a is directed into the first fluid duct 3a of the third cooling plate 2c, the coolant flowing through the second cooling plate 2b through the second fluid duct 3b of the third cooling plate. Downstream of the third cooling plate 3c, the two partial flows unite in the fluid branch 26.

Figure 3:
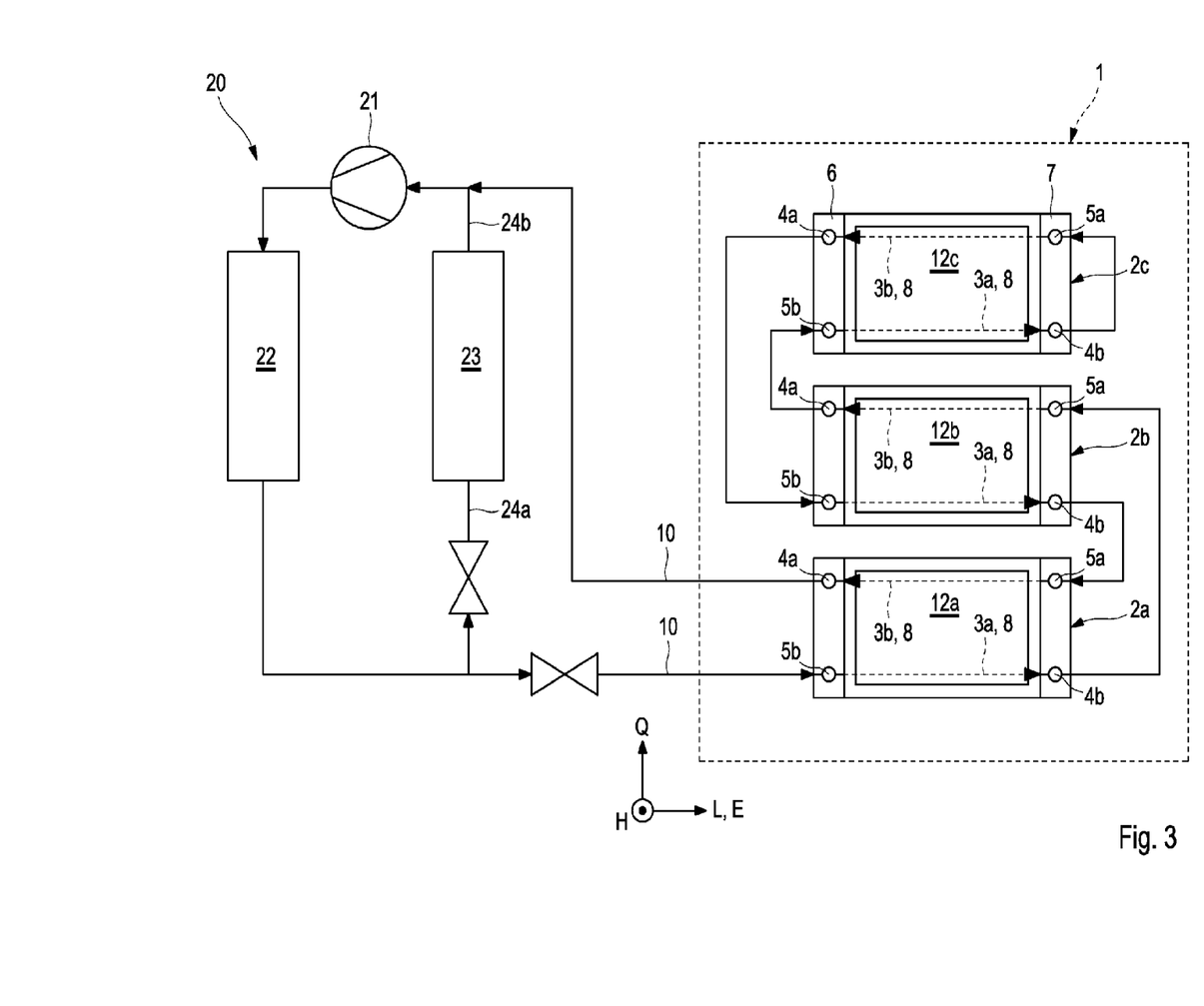

FIG. 3 shows in an illustration in the manner of a connection diagram an air conditioning circuit 20 for a motor vehicle, as is frequently used in modern motor vehicles for controlling the temperature of the vehicle interior. The air conditioning circuit 20 comprises a compressor 21 for compressing the coolant, and a condenser 22 arranged downstream of the compressor 21, for cooling or liquefying the compressed coolant. Upstream of the compressor 21, in turn a vaporizer 23 is provided, which is provided with a vaporizer inlet 24a and with a vaporizer outlet 24b. For controlling the temperature of the vehicle interior (not shown), the vaporizer 23 is coupled thermally thereto. The previously presented battery system is provided as part of the air conditioning circuit 20, wherein the cooling device 1 of the battery system communicates fluidically with the vaporizer inlet 24a and with the vaporizer outlet 24b.

The invention claimed is:

1. A cooling device for a battery system, comprising:
at least two battery units,
at least a first and a second cooling plate, able to be flowed through respectively by a coolant, which are arranged respectively for thermal coupling with a respective battery unit,
wherein the first and second cooling plate each include a first fluid inlet, which is connected fluidically with a first fluid outlet via a first fluid duct extending along an extent direction, and a second fluid inlet, which is connected fluidically with a second fluid outlet via a second fluid duct extending along the extent direction,
wherein the fluid inlets and the fluid outlets of all cooling plates are connected with one another such that in at least one cooling plate the coolant flowing in the extent direction of the respective cooling plate through the first fluid duct flows contrary to the extent direction through the second fluid duct of the same cooling plate or vice versa.

2. The cooling device according to claim 1, wherein a third cooling plate is provided.

3. The cooling device according to claim 1, wherein the fluid ducts of the at least two cooling plates are connected fluidically with one another such that the coolant flows successively through the fluid ducts at least of two different cooling plates.

4. The cooling device according to one of claim 1, wherein the fluid ducts of the at least two cooling plates are connected fluidically with one another such that the coolant in at most one particular cooling plate flows through the first fluid duct and subsequently flows directly through the second fluid duct of the same cooling plate.

5. The cooling device according to claim 1, wherein the fluid ducts of the cooling plates are connected fluidically in series to one another, so that no fluid branch is provided between two fluidically adjacent cooling plates.

6. The cooling device according to claim 1, wherein at least two cooling plates are connected fluidically parallel to one another, so that fluid branches are provided between at least two fluidically adjacent cooling plates for at least one of dividing and bringing together the coolant flow.

7. The cooling device according to claim 1, wherein the first and the second fluid duct comprises respectively at least one flat tube mounted on the cooling plate.

8. The cooling device according to claim 7, wherein the respective flat tube is formed integrally on the cooling plate.

9. A battery system with integrated cooling function, comprising:
at least a first and a second battery unit,
a cooling device, including:
at least a first cooling plate and a second cooling plate respectively flowable through by a coolant,
the first and second cooling plates respectively including a first fluid inlet connected fluidically with a first fluid outlet via a first fluid duct extending along an extent direction, and a second fluid inlet connected fluidically with a second fluid outlet via a second fluid duct extending along the extent direction,
wherein the fluid inlets and the fluid outlets of the cooling plates are connected with one another such that in a least one cooling plate the coolant flowing in the extent direction of the respective cooling plate through the first fluid duct flows opposite to the extent direction through the second fluid duct of the same cooling plate, or vice versa,
wherein each battery unit is thermally coupled respectively with an associated cooling plate.

10. The battery system according to claim 9, wherein a cover plate is associated with each cooling plate, such that the respective battery unit is arranged in the manner of a sandwich between the cooling plate and cover plate.

11. The battery system according to claim 10, wherein the cover plate includes a plate material of at least one of aluminium and plastic.

12. The battery system according to claim 9, wherein the fluid ducts of at least the first and second cooling plates are connected fluidically with one another such that the coolant flows successively through the fluid ducts.

13. The battery system according to claim 9, wherein the fluid ducts of at least the first and second cooling plates are connected fluidically with one another such that the coolant in the respective coolant plates flows through the first fluid duct and subsequently flows directly through the second fluid duct of the same cooling plate.

14. The battery system according to claim 9, wherein the fluid ducts of the cooling plates are connected fluidically in series to one another, such that no fluid branch is provided between two fluidically adjacent cooling plates.

15. The battery system according to claim 9, wherein the first and second cooling plates are connected fluidically parallel to one another, such that fluid branches are formed between fluidically adjacent cooling plates for at least one of dividing and bringing together the coolant flow.

16. The battery system according to claim 9, wherein the first fluid duct and the second fluid duct each are composed of at least one flat tube mounted on the respective cooling plate.

17. An air conditioning circuit for a motor vehicle, comprising:
- a compressor for compressing a coolant,
- a condenser, arranged downstream of the compressor, for cooling the compressed coolant,
- a vaporizer, arranged upstream of the compressor, which has a vaporizer inlet and a vaporizer outlet,
- a battery system, including:
  - a cooling device including at least a first cooling plate and a second cooling plate, which are flowable through by the coolant and are arranged respectively for thermal coupling with a respective battery unit,
  - wherein the first and second cooling plate respectively include a first fluid inlet which is connected fluidically with a first fluid outlet via a first fluid duct extending along an extent direction, and a second fluid inlet which is connected fluidically with a second fluid outlet via a second fluid duct extending along the axial direction, the fluid ducts of the first and second cooling plate connected fluidically with one another such that the coolant flows successively through the fluid ducts of at least two different cooling plates,
  - wherein at least one of the first fluid duct and the second fluid duct is composed of at least two flat tubes extending along a longitudinal direction of the cooling plate and mounted on the cooling plate,
  - wherein the fluid inlets and the fluid outlets of the cooling plates are connected with one another such that in at least one cooling plate a coolant flowing in the extent direction of the respective cooling plate through the flat tubes of the first fluid duct flows contrary to the extent direction through the flat tubes of the second fluid duct of the same cooling plate, or vice versa,
  - at least two battery units, wherein each battery unit is thermally coupled with an associated cooling plate, and
- wherein the cooling device communicates fluidically with the vaporizer inlet and with the vaporizer outlet.

18. The air conditioning circuit according to claim 17, wherein the fluid ducts of the first and second cooling plates are connected fluidically with one another such that the coolant of the cooling plates flows through the flat tubes of the first fluid duct and subsequently flows directly through the flat tubes of the second fluid duct of the same cooling plate.

19. The air conditioning circuit according to claim 17, wherein the fluid ducts of the cooling plates are connected fluidically in series to one another, such that no fluid branch is provided between two fluidically adjacent cooling plates.

20. The air conditioning circuit according to claim 17, wherein the first and second cooling plates are connected fluidically parallel to one another, such that fluid branches are provided between adjacent cooling plates for at least one of dividing and bringing together the coolant flow.

* * * * *